(12) United States Patent
Dhaens et al.

(10) Patent No.: US 12,202,306 B2
(45) Date of Patent: Jan. 21, 2025

(54) VEHICLE CONTROL SYSTEMS AND METHODS BASED ON TRAILER HITCH JOINT FORCES

(71) Applicant: DRiV Automotive Inc., Southfield, MI (US)

(72) Inventors: Miguel Dhaens, Lommel (BE); Victor Mazzilli, Guildford (GB); Gabriele Rini, Guildford (GB); Patrick Gruber, Guildford (GB); Aldo Sorniotti, Guildford (GB); Sebastiaan Van Aalst, Hasselt (BE)

(73) Assignee: DRiV Automotive Inc., Northville, MI (US)

( * ) Notice: Subject to any disclaimer, the term of this patent is extended or adjusted under 35 U.S.C. 154(b) by 301 days.

(21) Appl. No.: 17/861,825

(22) Filed: Jul. 11, 2022

(65) Prior Publication Data

US 2024/0010036 A1    Jan. 11, 2024

(51) Int. Cl.
*B60D 1/30* (2006.01)
*B60D 1/62* (2006.01)

(52) U.S. Cl.
CPC ...... *B60D 1/30* (2013.01); *B60D 1/62* (2013.01)

(58) Field of Classification Search
CPC .......... B62D 1/62; B62D 5/046; B60G 17/06; B60G 17/0195; B60G 17/0162;
(Continued)

(56) References Cited

U.S. PATENT DOCUMENTS 6,042,196 A * 3/2000 Nakamura ............... B60T 7/12
                                                      303/7
6,806,809 B2  10/2004 Lee et al.
(Continued)

FOREIGN PATENT DOCUMENTS

| CN | 113401114 B | 3/2022 |
| DE | 102006007805 B4 | 1/2008 |
| WO | WO-2008000558 A1 | 1/2008 |

OTHER PUBLICATIONS

Extended European Search Report regarding Patent Application No. 23182798.1, dated Dec. 4, 2023.
(Continued)

*Primary Examiner* — Yuri Kan
(74) *Attorney, Agent, or Firm* — Harness, Dickey & Pierce, P.L.C.

(57) ABSTRACT

A trailer sway control system for a vehicle includes: a front left active suspension actuator; a front right active suspension actuator; a rear left active suspension actuator; a rear right active suspension actuator; and an actuator control module configured to: based on (a) a first hitch force at a trailer hitch in a longitudinal direction, (b) a second hitch force at the trailer hitch in a lateral direction, and (c) a third hitch force at the trailer hitch in a vertical direction, determine target vertical forces for the front left active suspension actuator, the front right active suspension actuator, the rear left active suspension actuator, and the rear right active suspension actuator, respectively; and selectively adjust the front left active suspension actuator, the front right active suspension actuator, the rear left active suspension actuator, and the rear right active suspension actuator based on the target vertical forces, respectively.

20 Claims, 10 Drawing Sheets

(58) Field of Classification Search
CPC ......... B60G 21/051; B60G 13/14; B60T 7/12; B60T 8/1708; B60W 40/112; B60W 30/18181; B60W 30/1819; B60W 40/10; G01S 15/931
See application file for complete search history.

(56) References Cited

U.S. PATENT DOCUMENTS

| | | | |
|---|---|---|---|
| 7,272,481 B2 | 9/2007 | Einig et al. | |
| 8,010,252 B2 | 8/2011 | Getman et al. | |
| 8,046,147 B2 | 10/2011 | Waldbauer et al. | |
| 8,326,504 B2 | 12/2012 | Wu et al. | |
| 9,868,333 B2 * | 1/2018 | Göhrle | B60G 17/06 |
| 10,173,722 B2 * | 1/2019 | Pourrezaei Khaligh | B60D 1/62 |
| 10,328,917 B2 | 6/2019 | Ying et al. | |
| 11,623,643 B2 * | 4/2023 | Sung | B60W 40/10 701/22 |
| 2003/0033063 A1 * | 2/2003 | Kawashima | B60G 13/14 701/37 |
| 2005/0027402 A1 * | 2/2005 | Koibuchi | B60W 30/1819 701/1 |
| 2008/0223638 A1 | 9/2008 | Niwa | |
| 2009/0093928 A1 * | 4/2009 | Getman | G01S 15/931 701/37 |
| 2009/0271078 A1 | 10/2009 | Dickinson | |
| 2010/0211277 A1 | 8/2010 | Craig et al. | |
| 2014/0014425 A1 * | 1/2014 | Yamanaka | B60G 21/051 180/65.51 |
| 2019/0185006 A1 * | 6/2019 | Dhaens | B60W 30/18181 |
| 2019/0283733 A1 * | 9/2019 | Takei | B60G 17/0195 |
| 2020/0180381 A1 * | 6/2020 | Lee | B60G 17/0162 |
| 2021/0086623 A1 | 3/2021 | Yao et al. | |
| 2021/0387630 A1 | 12/2021 | Sung | |
| 2023/0097516 A1 * | 3/2023 | Furuta | B60W 40/112 701/37 |
| 2023/0249714 A1 * | 8/2023 | Shono | B62D 5/046 701/23 |
| 2024/0010041 A1 * | 1/2024 | Mistry | B60G 17/0195 |
| 2024/0010186 A1 * | 1/2024 | Dhaens | B60T 8/1708 |

OTHER PUBLICATIONS

Zanchetta Mattia et al: "Trailer control through vehicle yaw moment control: Theoretical analysis and experimental assessment", Mechatronics, Pergamon Press, Oxford, GB, vol. 64, Nov. 18, 2019 (Nov. 18, 2019), XP085928765, ISSN: 0957-4158, DOI: 10.1016/J. MECHATRONICS.2019.102282 [retrieved on Nov. 18, 2019].
Extended European Search Report regarding Application No. 23182787. 4, mailed Dec. 4, 2023.

* cited by examiner

VEHICLE CONTROL SYSTEMS AND METHODS BASED ON TRAILER HITCH JOINT FORCES

FIELD

The present disclosure relates to control systems and methods of vehicles and more particularly to vehicle control based on forces at a hitch where a trailer is hitched to the vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various different types of vehicles are available. For example, coupes, sedans, convertibles, trucks, station wagons, and utility vehicles are available. There are multiple different types of utility vehicles, such as sport utility vehicles (SUVs), crossover utility vehicles, etc.

Some types of vehicles are designed to tow trailers. For example, trucks and utility vehicles may be used to tow trailers. Various different types of trailers are available. Examples of trailers include cargo trailers, trailers for vehicles (e.g., land based vehicles, watercraft, etc.), travel trailers, and other types of trailers.

SUMMARY

In a feature, a trailer sway control system for a vehicle includes: a front left active suspension actuator associated with a front left wheel of the vehicle; a front right active suspension actuator associated with a front right wheel of the vehicle; a rear left active suspension actuator associated with a rear left wheel of the vehicle; a rear right active suspension actuator associated with a rear right wheel of the vehicle; and an actuator control module configured to: based on (a) a first hitch force at a trailer hitch of the vehicle in a longitudinal direction, (b) a second hitch force at the trailer hitch of the vehicle in a lateral direction, and (c) a third hitch force at the trailer hitch of the vehicle in a vertical direction, determine target vertical forces for the front left active suspension actuator, the front right active suspension actuator, the rear left active suspension actuator, and the rear right active suspension actuator, respectively; and selectively adjust the front left active suspension actuator, the front right active suspension actuator, the rear left active suspension actuator, and the rear right active suspension actuator based on the target vertical forces, respectively.

In further features, the actuator control module is configured to determine the target vertical forces based on minimizing (a) a first difference between the first hitch force and a first reference hitch force, (b) a second difference between the second hitch force and a second reference hitch force, and (c) a third difference between the third hitch force and a third reference hitch force.

In further features, a reference hitch forces module is configured to set the first reference hitch force, the second reference hitch force, and the third reference hitch force based on a steering angle of the vehicle.

In further features, the actuator control module is configured to determine the target vertical forces further based on a yaw rate of the vehicle.

In further features, the actuator control module is configured to determine the target vertical forces based on minimizing a difference between the yaw rate and a reference yaw rate.

In further features, a reference yaw rate module is configured to set the reference yaw rate based on a steering angle of the vehicle.

In further features, the reference yaw rate module is configured to set the reference yaw rate further based on a vehicle speed.

In further features: a front left electric motor is configured to output torque to the front left wheel of the vehicle; a front right electric motor is configured to output torque to the front right wheel of the vehicle; a rear left electric motor is configured to output torque to the rear left wheel of the vehicle; a rear right electric motor is configured to output torque to the rear right wheel of the vehicle; and a wheel control module is configured to: based on the first hitch force, the second hitch force, and the third hitch force, determine target torque outputs of the front left electric motor, the front right electric motor, the rear left electric motor, and the rear right electric motor, respectively; and selectively adjust the front left electric motor, the front right electric motor, the rear left electric motor, and the rear right electric motor based on the target torque outputs, respectively.

In further features, the wheel control module is configured to determine the target torque outputs further based on the target vertical forces.

In further features, the actuator control module is configured to determine the target vertical forces further based on the target torque outputs.

In further features: a front electric motor is configured to output torque to front wheels of the vehicle; a rear electric motor is configured to output torque to front wheels of the vehicle; and a wheel control module is configured to: based on the hitch angle, determine target torque outputs of the front and rear electric motors, respectively; and selectively adjust the front and rear electric motors based on the target torque outputs, respectively.

In further features: an electric motor is configured to output torque two or more wheels of the vehicle; and a wheel control module is configured to: based on the hitch angle, determine a target torque of the electric motor; and selectively adjust the electric motor based on the target torque.

In a feature, a trailer sway control method for a vehicle includes: based on (a) a first hitch force at a trailer hitch of the vehicle in a longitudinal direction, (b) a second hitch force at the trailer hitch of the vehicle in a lateral direction, and (c) a third hitch force at the trailer hitch of the vehicle in a vertical direction, determining target vertical forces for a front left active suspension actuator, a front right active suspension actuator, a rear left active suspension actuator, and a rear right active suspension actuator, respectively, the front right active suspension actuator associated with a front right wheel of the vehicle, the front left active suspension actuator associated with a front left wheel of the vehicle, the rear left active suspension actuator associated with a rear left wheel of the vehicle, and the rear right active suspension actuator associated with a rear right wheel of the vehicle; and selectively adjusting the front left active suspension actuator, the front right active suspension actuator, the rear left active suspension actuator, and the rear right active suspension actuator based on the target vertical forces, respectively.

In further features, determining the target vertical forces includes determining the target vertical forces based on minimizing (a) a first difference between the first hitch force and a first reference hitch force, (b) a second difference between the second hitch force and a second reference hitch force, and (c) a third difference between the third hitch force and a third reference hitch force.

In further features, the method further includes setting the first reference hitch force, the second reference hitch force, and the third reference hitch force based on a steering angle of the vehicle.

In further features, determining the target vertical forces includes determining the target vertical forces further based on a yaw rate of the vehicle.

In further features, determining the target vertical forces includes determining the target vertical forces based on minimizing a difference between the yaw rate and a reference yaw rate.

In further features, the method further includes setting the reference yaw rate based on a steering angle of the vehicle.

In further features, setting the reference yaw rate includes setting the reference yaw rate further based on a vehicle speed.

In further features, the method further includes: based on the hitch angle, determining a target torque of an electric motor configured to output torque two or more wheels of the vehicle; and selectively adjust the electric motor based on the target torque.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles may be used to tow trailers. A vehicle may include one or more trailer sway mitigation modules that selectively adjust one or more operating parameters of the vehicle to decrease sway of a trailer when swaying occurs.

The present application involves control of at least one of suspension actuators of the vehicle and wheel torques of the vehicle based on a one or more hitch forces at the hitch where the trailer is hitched to the vehicle. The hitch forces include a force in a longitudinal direction of the trailer, a lateral direction of the trailer, and a vertical direction. The control enhances cornering stability of a vehicle towing a trailer and minimizes sway of the trailer.

Figure 1:
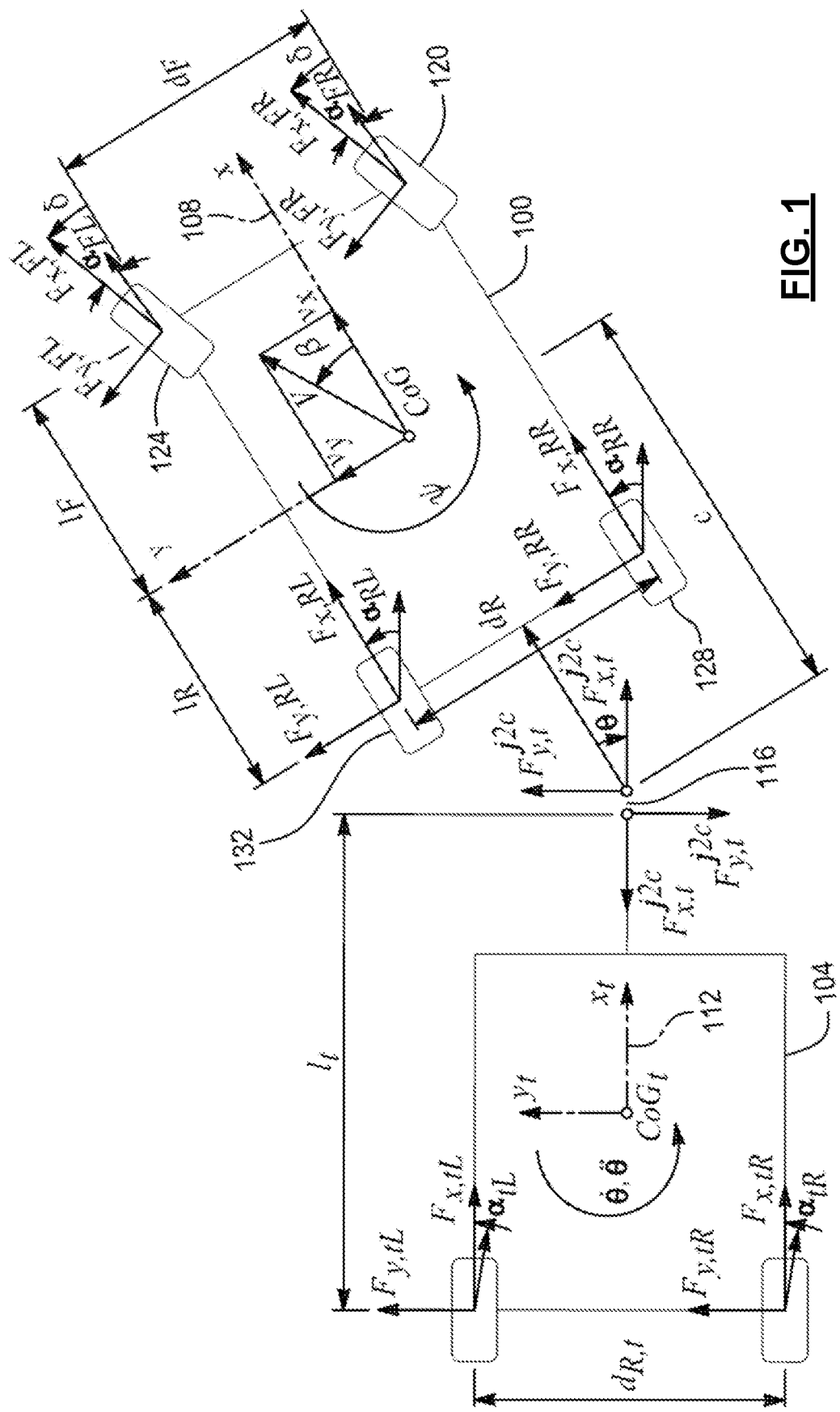
FIG. 1 is top view of a model including a vehicle and a trailer.

FIG. 1 is top view of a model including a vehicle 100 and a trailer 104. CoG represents the center of gravity of a body. Longitudinal axes of the vehicle 100 and the trailer 104 are illustrated by 108 and 112, respectively. The trailer 104 is hitched to the vehicle 100 at trailer hitch 116. A hitch angle θ represents the angle between the longitudinal axes of the vehicle 100 and the trailer 104 (between 108 and 112). A hitch force in a longitudinal direction of the trailer 104 is expressed as $F_{x,t}$. A hitch force in a lateral direction of the trailer 104 is expressed as $F_{y,t}$.

Figure 2:
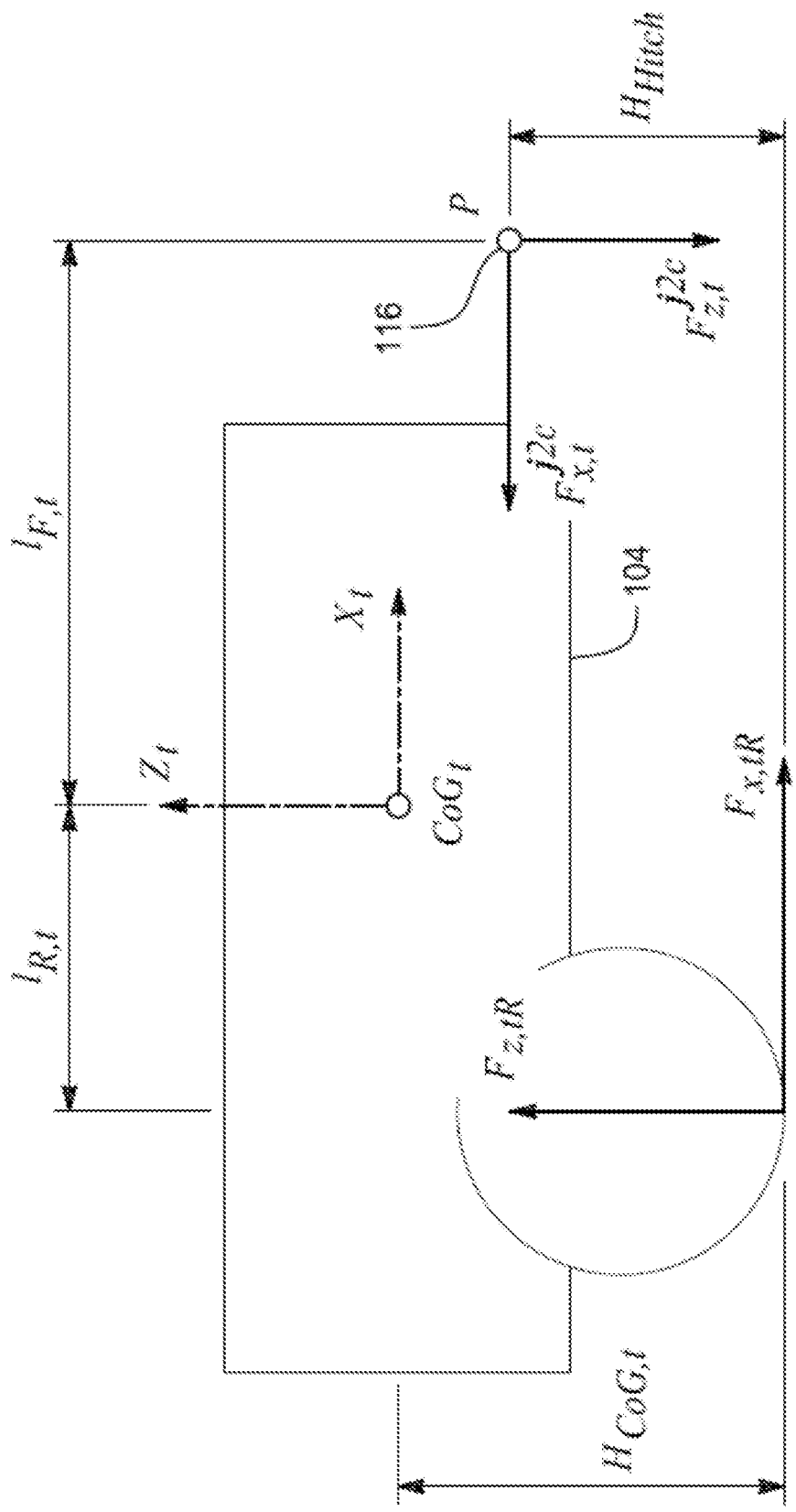
FIG. 2 is a side view of an example model of the trailer including various parameters.

The vehicle 100 includes front right and left wheels 120 and 124, respectively. The vehicle 100 also includes rear right and left wheels 128 and 132, respectively. The front wheels 120 and 124 are turnable left and right to enable vehicle turning. In various vehicles, the rear wheels 128 and 132 may also be turnable left and right or may be fixed parallel to the longitudinal axis 108 of the vehicle 100. The trailer 104 includes two or more wheels, such as illustrated. Parameters of the trailer 104 are denoted with a subscript t. FIG. 2 is a side view of an example model of the trailer 104 including various parameters. A hitch force in a vertical direction of the trailer 104 is expressed as $F_{z,t}$.

Figure 3:
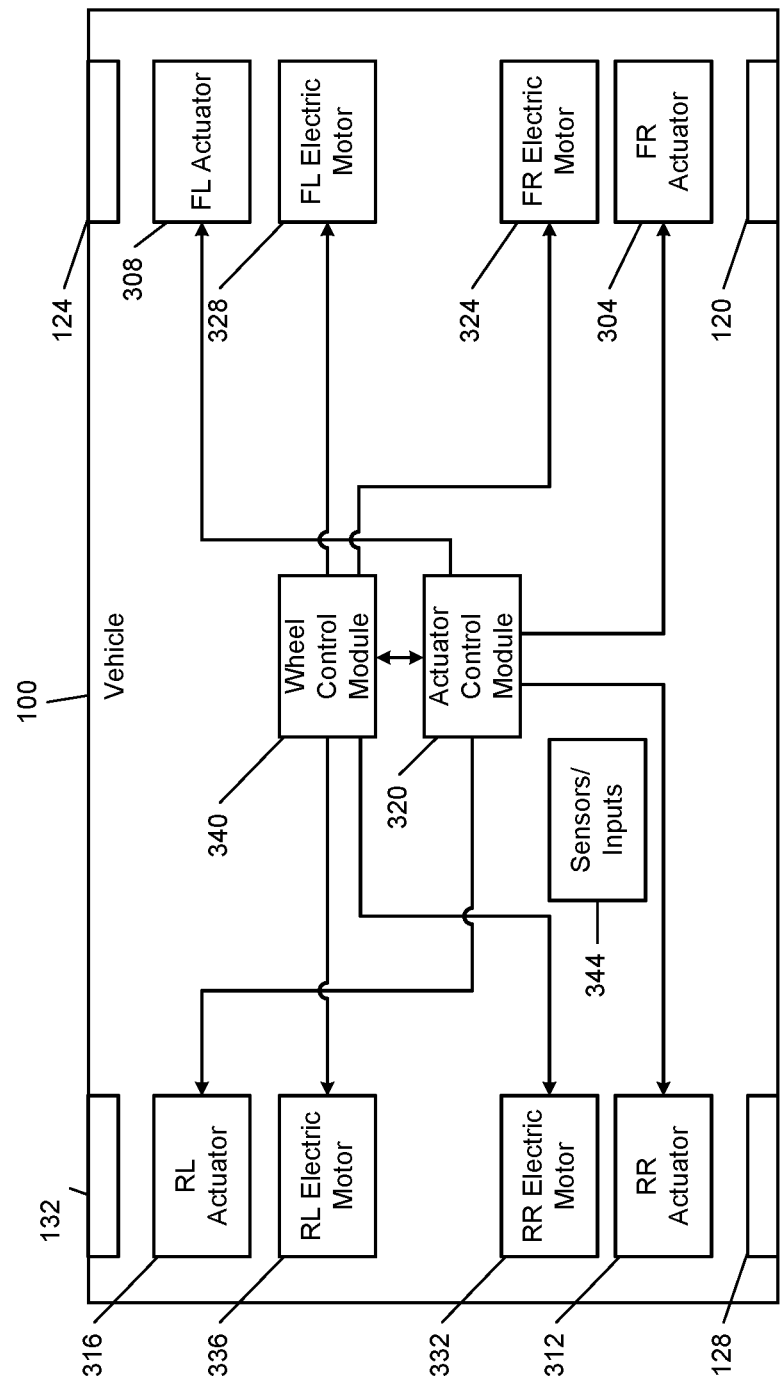
FIG. 3 is a functional block diagram of example components of the vehicle.

FIG. 3 is a functional block diagram of example components of the vehicle 100. As discussed above, the vehicle 100 includes the front right and left wheels 120 and 124 and the rear right and left wheels 128 and 132. The vehicle 100 may include additional wheels, such as in the example of dual rear wheel vehicles.

A front right (FR) suspension actuator 304 is an active suspension actuator and damps vertical motion near a FR corner of the vehicle 100, such as at the front right wheel 120. A front left (FL) suspension actuator 308 is an active suspension actuator and damps vertical motion near a FL corner of the vehicle 100, such as at the front left wheel 124. A rear right (RR) suspension actuator 312 is an active suspension actuator and damps vertical motion near a RR corner of the vehicle 100, such as at the rear right wheel 128. A rear left (RL) suspension actuator 316 is an active suspension actuator and damps vertical motion near a RL corner of the vehicle 100, such as at the rear left wheel 132. An actuator control module 320 controls damping forces ($F_{s,FR}$, $F_{s,FL}$, $F_{s,RR}$, $F_{s,RL}$) of the suspension actuators 304, 308, 312, and 316, respectively, based on at least one of the hitch forces ($F_{x,t}$, $F_{y,t}$, $F_{z,t}$), as discussed further below. The actuator control module 320 may control, for example, a pressure of a hydraulic fluid within one or more portions of a suspension actuator, control electric power (e.g., voltage, current) applied to a suspension actuator, or control the damping force of the suspension actuator in another suitable manner.

The vehicle 100 includes one or more torque producing devices that output torque to two or more of the wheels 120-132. For example, the vehicle 100 may include a FR electric motor 324 that outputs torque to the FR wheel 120 and a FL electric motor 328 that outputs torque to the FL wheel 124. The vehicle 100 may also include a RR electric motor 332 that outputs torque to the RR wheel 128 and a RL electric motor 336 that outputs torque to the RL wheel 132. Other motor configurations are also possible, such as one electric motor that outputs torque to the front wheels 120 and 124 and/or one electric motor that outputs torque to the rear wheels 128 and 132. Electric motors can also apply negative torque to slow/brake the vehicle 100. The vehicle 100 also includes friction brakes at each wheel that can be applied to slow that wheel. A wheel control module 340 controls the torque at each wheel. For example, the wheel control module 340 may control the torque at a wheel via controlling an electric motor and/or controlling application of the friction brake at that wheel. Additionally or alternatively to the actuator control module 320 controlling the damping forces based on the hitch force(s), the wheel control module 340 may control the torques ($\tau_{m,FR}$, $\tau_{m,FL}$, $\tau_{m,RR}$, $\tau_{m,RL}$) at the wheels, respectively, based on the hitch force(s).

The vehicle 100 includes various sensors and other input devices collectively illustrated by 344. Examples of sensors include but are not limited to an accelerator pedal position (APP) sensor, a brake pedal position (BPP) sensor, and other types of sensors. Examples of other types of input devices include, for example, cameras, radar sensors, ultrasonic sensors, and other types of sensors. As an example of a camera, a rear backup camera may be included. Images from the rear backup camera may be used to determine the hitch angle of the trailer 104. In various implementations, the hitch angle may be determined, measured, or estimated in another suitable manner.

Figure 4:
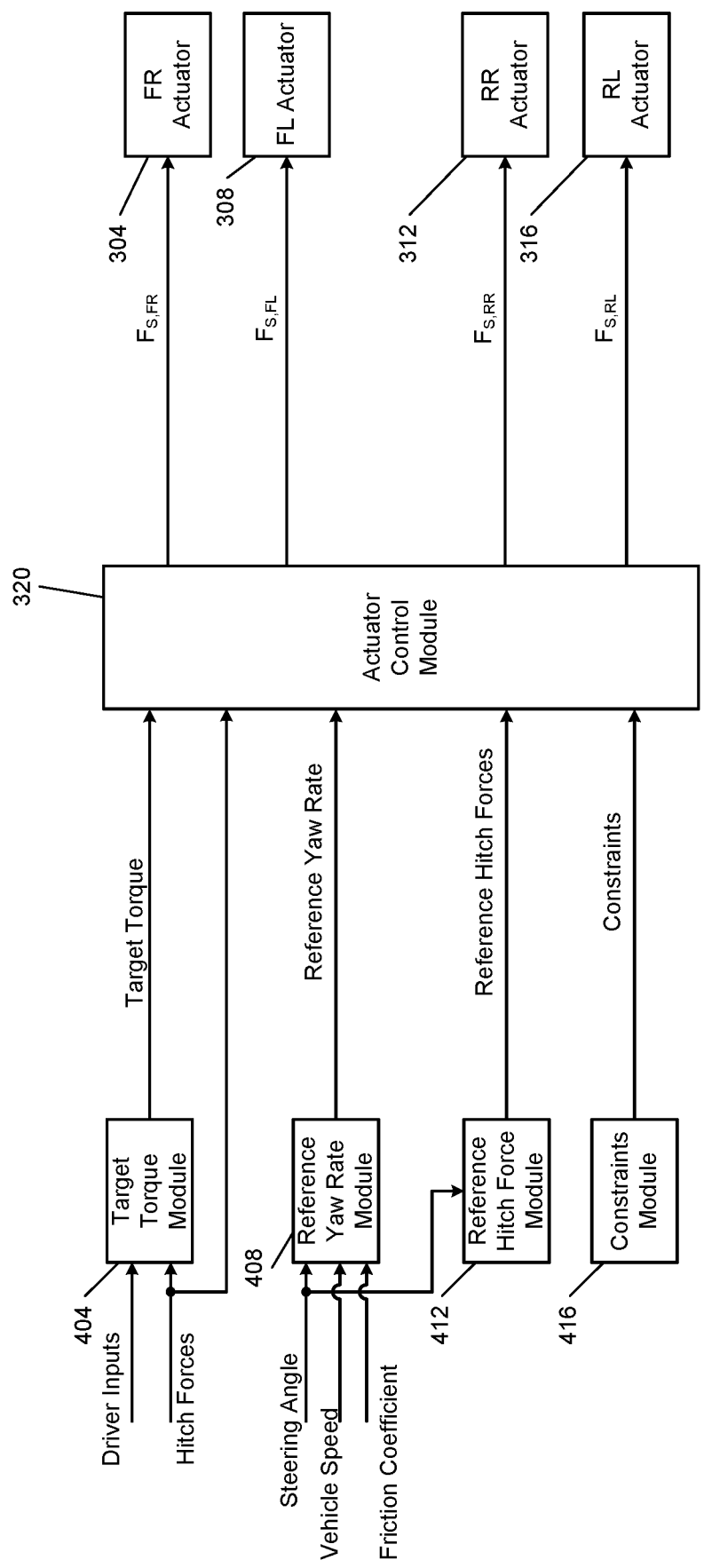
FIGS. 4-9 are functional block diagrams of example implementations of a trailer sway control system.

FIG. 4 is a functional block diagram of an example implementation of a trailer sway control system. A target torque module 404 determines a target torque ($\tau_{m,tot,d}$) based on one or more driver inputs and the hitch forces of the trailer 104. The target torque module 404 may determine the target wheel torque, for example, using one or more equations and/or lookup tables that relate the driver inputs and the hitch forces to target torques. The driver inputs may include, for example, the APP measured using the APP sensor and the BPP measured using the BPP sensor.

A reference yaw rate module 408 determines a reference (target) yaw rate of the vehicle based on one or more inputs, such as steering angle $\delta$, vehicle speed V, and tire-road coefficient of friction pt. The reference yaw rate module 408 may determine the reference yaw rate using one or more equations and/or lookup tables that relate steering angles, vehicle speeds, and coefficients to reference yaw rates. The steering angle may be determined, for example, based on measurements from a steering wheel angle (SWA) sensor, such as using one or more lookup tables or equations that relate SWAs to steering angles. The vehicle speed may be measured or estimated using one or more sensors. For example, the vehicle speed may be set based on one or more wheel speeds measured using one or more wheel speed sensors, respectively. The tire-road coefficient of friction may be determined, for example, based on wheel slip. The reference yaw rate module 408 may filter the reference yaw rate before use, such as using a first order transfer function or another suitable filter. In various implementations, the vehicle speed and tire-road coefficient of friction may not be used, and the reference yaw rate module 408 may determine the reference yaw rate based on the steering angle. Further example detail is provided below.

A reference hitch forces module 412 determines reference (target) hitch forces. The reference hitch forces module 412 may determine the reference hitch forces based on the steering angle and one or more other parameters. The reference hitch forces module 412 may determine the reference hitch forces using one or more equations and/or lookup tables that relate the steering angle and the other parameter(s) to reference hitch forces. Further example detail is provided below.

A constraints module 416 determines one or more constraints (or limits). The constraints may be fixed predetermined values or may be variable. In the example of variables, the constraints module 416 may set one or more of the constraints based on one or more operating parameters of the vehicle 100 and/or the trailer 104.

The actuator control module 320 determines the damping forces for the suspension actuators 304-316, respectively, based on the target torque, (present) hitch forces, the reference yaw rate, the reference hitch forces, and the constraints. The actuator control module 320 may determine the damping forces further based on a present yaw rate of the vehicle 100. The present yaw rate of the vehicle 100 may be, for example, measured using a yaw rate sensor (of the sensors 344). The actuator control module 320 may determine the damping forces using one or more equations and/or lookup tables that relate target torques, reference yaw rates, yaw rates, reference hitch forces, hitch forces, and constraints to damping forces. The actuator control module 320 may determine the damping forces to minimize the difference (error) between the yaw rate and the reference yaw rate and to minimize the difference (error) between the hitch forces and the reference hitch forces. In other words, the actuator control module 320 may determine the damping forces to adjust the yaw rate toward or to the reference yaw rate and adjust the hitch forces toward or to the reference hitch forces.

The actuator control module 320 controls the suspension actuators 304-316 to achieve the damping forces, respectively. The actuator control module 320 may control, for example, hydraulic pressure and/or power applied to the suspension actuators 304-416.

In various implementations, the actuator control module 320 may initiate controlling the damping forces based on the hitch forces when the yaw rate is different than the target yaw rate by at least a predetermined amount. In various implementations, the actuator control module 320 may continuously control the damping forces based on the hitch forces, even when the yaw rate is within the predetermined amount of the target yaw rate.

In various implementations, the actuator control module 320 may set the damping forces using model predictive control (MPC), such as a nonlinear model predictive control (NMPC).

Figure 5:
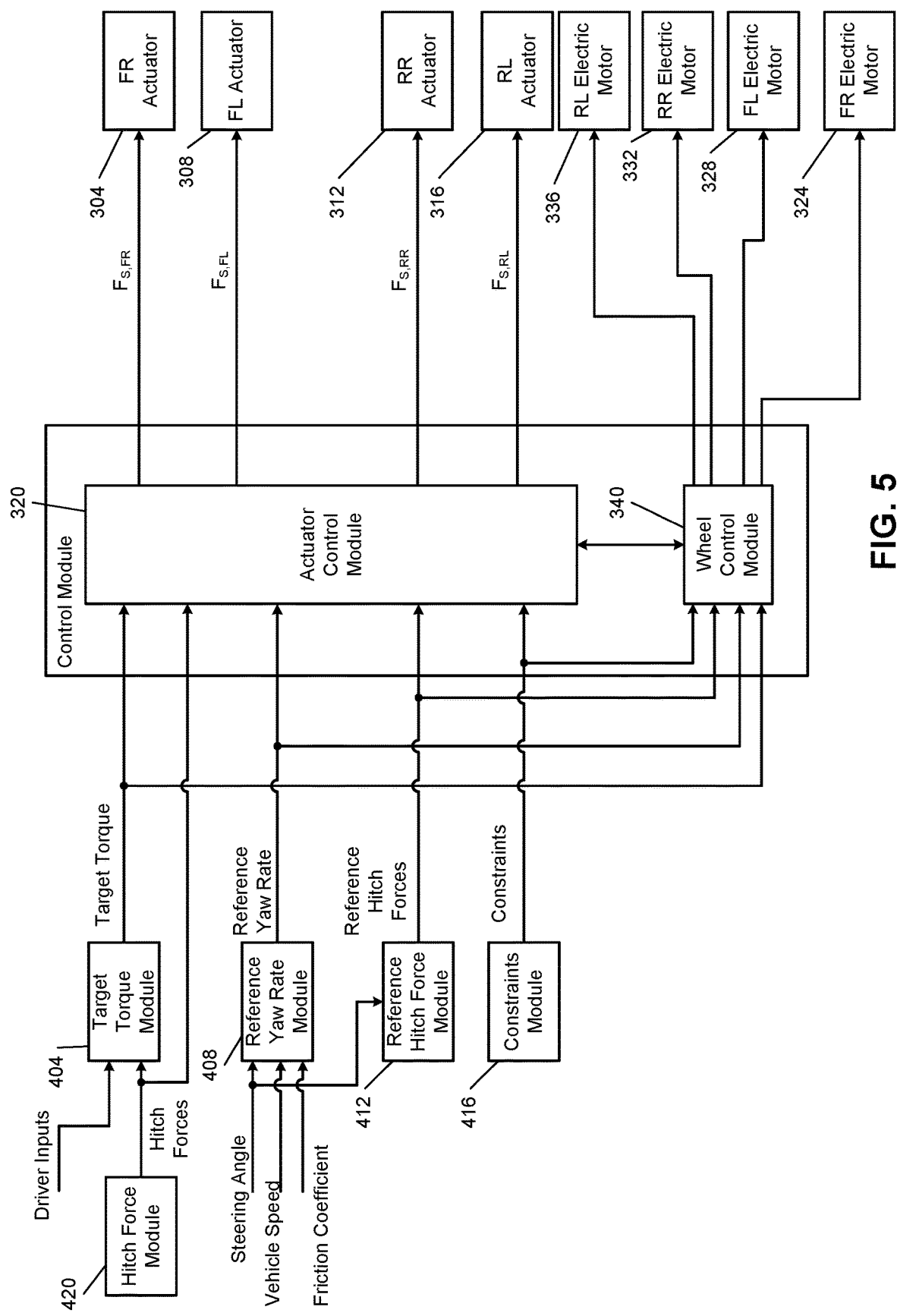

FIG. 5 is a functional block diagram of an example control system. As illustrated in FIG. 5, the wheel control module 340 may determine the torques ($\tau_{m,FR}$, $\tau_{m,FL}$, $\tau_{m,RR}$, $\tau_{m,RL}$) at the wheels, respectively, based on the target torque, (present) hitch forces, the reference yaw rate, the reference hitch forces, and the constraints. The wheel control module 340 may determine the torques further based on the present yaw rate of the vehicle 100. The wheel control module 340 may determine the torques using one or more equations and/or lookup tables that relate target torques, reference yaw rates, yaw rates, reference hitch forces, hitch forces, and constraints to wheel torques. The wheel control module 340 may determine the torques to minimize the difference (error) between the yaw rate and the reference yaw rate and to minimize the difference (error) between the hitch forces and the reference hitch forces. In other words, the wheel control module 340 may determine the torques to adjust the yaw rate toward or to the reference yaw rate and adjust the hitch forces toward or to the reference hitch forces.

The wheel control module 340 controls the motors 324-336 to achieve the torques, respectively. The wheel control module 340 may for example control the power applied to the electric motors 324-336 based on the torques, respectively. The wheel control module 340 may additionally control application of the friction brakes of the wheels based on the torques, respectively. While the example of one motor per wheel is provided, the present application is also applicable to one electric motor for the front axle and one electric motor for the rear axle and to only one electric motor for the front or rear axle. In various implementations, an internal combustion engine may be included, and the wheel control module 340 may additionally or alternatively control torque output of the internal combustion engine based on the torques. In various implementations, the wheel control module 340 may additionally or alternatively control one or more differentials based on the torques.

In various implementations, the wheel control module 340 may initiate controlling the torques based on the hitch forces when the yaw rate is different than the target yaw rate by at least a predetermined amount. In various implementations, the wheel control module 340 may continuously control the torques based on the hitch forces, even when the yaw rate is within the predetermined amount of the target yaw rate.

In various implementations, the actuator control module 320 and the wheel control module 340 may share parameters. For example, the actuator control module 320 may set the damping forces at the wheels based on the torques, respectively, at the wheels. As another example, the wheel control module 340 may set the torques at the wheels based on the damping forces, respectively, at the wheels.

In various implementations, the wheel control module 340 may set the torques using MPC control, such as NMPC control. An example implementation of NMPC control of the wheel torques is discussed further below. An example implementation of NMPC control of the damping forces and the wheel torques is also discussed further below. In various implementations, the wheel control module 340 and the actuator control module 320 may be implemented together within a control module, such as illustrated in FIG. 5.

The driver inputs may be assumed to be constant along the NMPC prediction horizon. The driver inputs may include the steering angle $\theta_w$, the accelerator pedal position APP, and the brake pedal position or force BPP. Other inputs that may be fixed along the prediction horizon are: i) the towing vehicle 100 longitudinal and lateral accelerations, $a_x$ and $a_y$ that may be used to determine the load transfers (e.g., by the actuator control module); ii) a baseline front-to-total anti-roll moment distribution for; control parameters, e.g., constraints, weights, flags, etc.; iv) the trailer 104 longitudinal and lateral accelerations (which may be estimated) $\alpha_{x,t}$ and $\alpha_{y,t}$. Control of the vehicle yaw rate and hitch force dynamics adopts the reference variables that define the steady-state cornering condition of the vehicle, for the given driver inputs.

The steady-state reference yaw rate of the vehicle-trailer system $\dot{\psi}_{ref}$ is configured to match a steady-state cornering response of the passive rigid vehicle. $\dot{\psi}_{ref}$ may be stored as nonlinear map (e.g., lookup table), and the reference yaw rate may be determined as function of steering angle δ, vehicle speed V, and tire-road friction coefficient pt. The output of the map (lookup table) may be filtered by the reference yaw rate module 408, such as using a first order transfer function. The dynamic instability of the vehicle-trailer system may be detected by the control module when the actual yaw rate differs from the reference yaw rate by at least a predetermined amount. The map may be based on, for example, a nonlinear quasi-static or dynamic vehicle models and minimize additional key performance criteria such as tire slip power losses or total power losses. In various implementations, the reference yaw rate may be determined by the reference yaw rate module 408 based only on the steering angle.

The reference yaw rate may target the control of the vehicle cornering behavior, but may also account for the trailer presence. In various implementations example, the reference yaw rate module 408 may apply a band pass filter that outputs signals within a predetermined frequency band that are indicative of actual trailer sway. The predetermined frequency band may be, for example, 0.5 Hertz (Hz) to 1.5 Hz or another suitable frequency band. In various implementations, the control module may blend the yaw rate and hitch forces reference contributions when the trailer dynamics when one or more differences between ones of the hitch forces and respective reference hitch forces is/are greater than a predetermined value. The hitch forces may be measured using a sensor or estimated. In various implementations, the hitch forces may be determined by a hitch forces module 420 based on one or more measured operating parameters of the vehicle 100 and parameters of the trailer 104, for example, using one or more lookup tables and/or equations.

Vehicle roll stability may be preserved by the control module during steering maneuvers by controlling the actuators 304-316 and/or the motors 316-336 to adjust a roll angle toward or to a target roll angle of the sprung masses. The target roll angle may be a predetermined value, such as 1 degree for a lateral acceleration of 5 m/s 2 or another suitable value. In various implementations, the control module may control the actuators 304-316 and/or the motors 316-336 to adjust a rollover prevention index RI which depends on roll dynamics and lateral acceleration to less than a predetermined value, such as 0.8 or another suitable value.

Despite being an additional reference state for the vehicle-semitrailer stability, roll angle may not be considered among the target variables in various implementations. Details of various parameters are illustrated in FIGS. 1 and 2.

Figure 6:
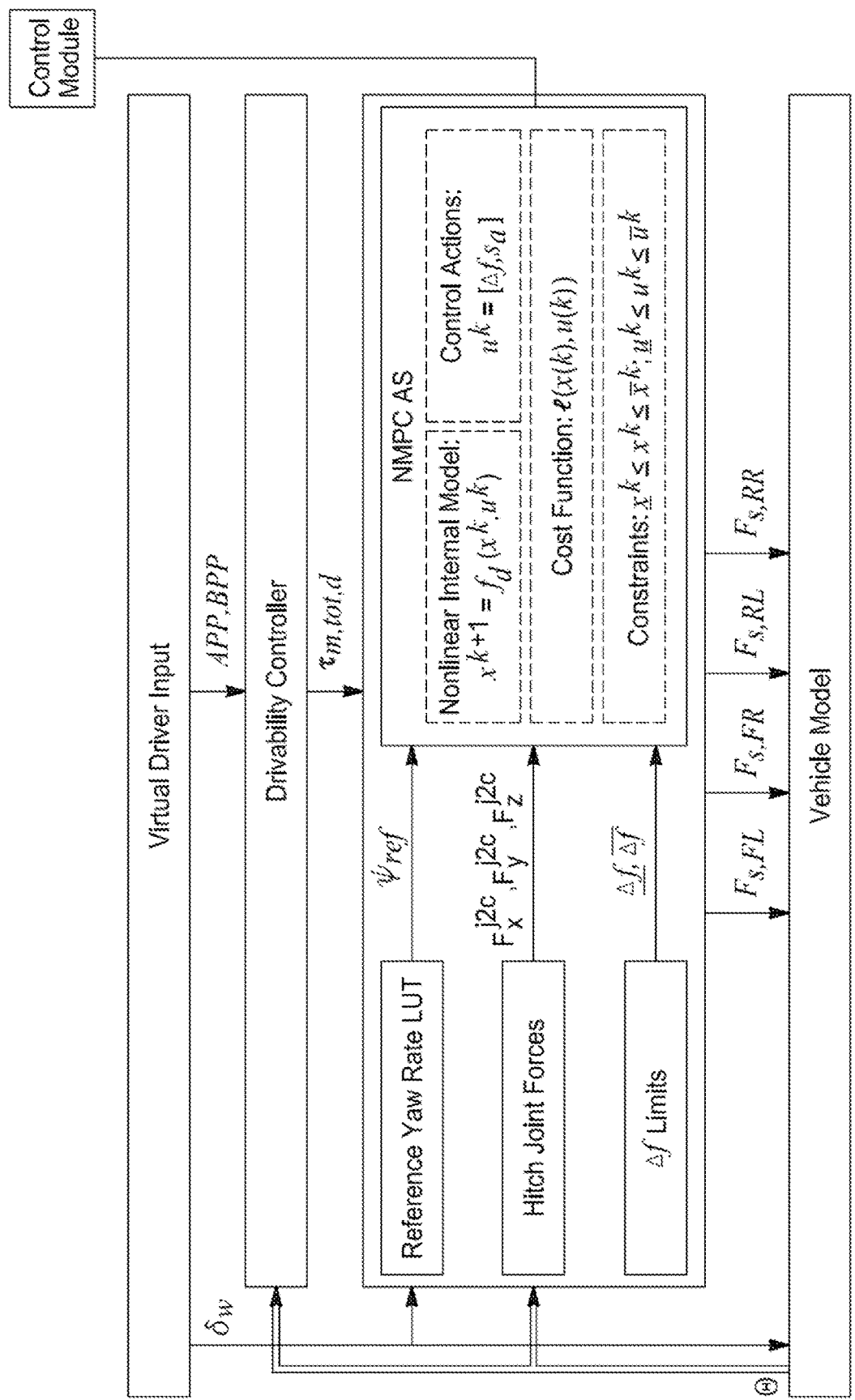
Figure 7:
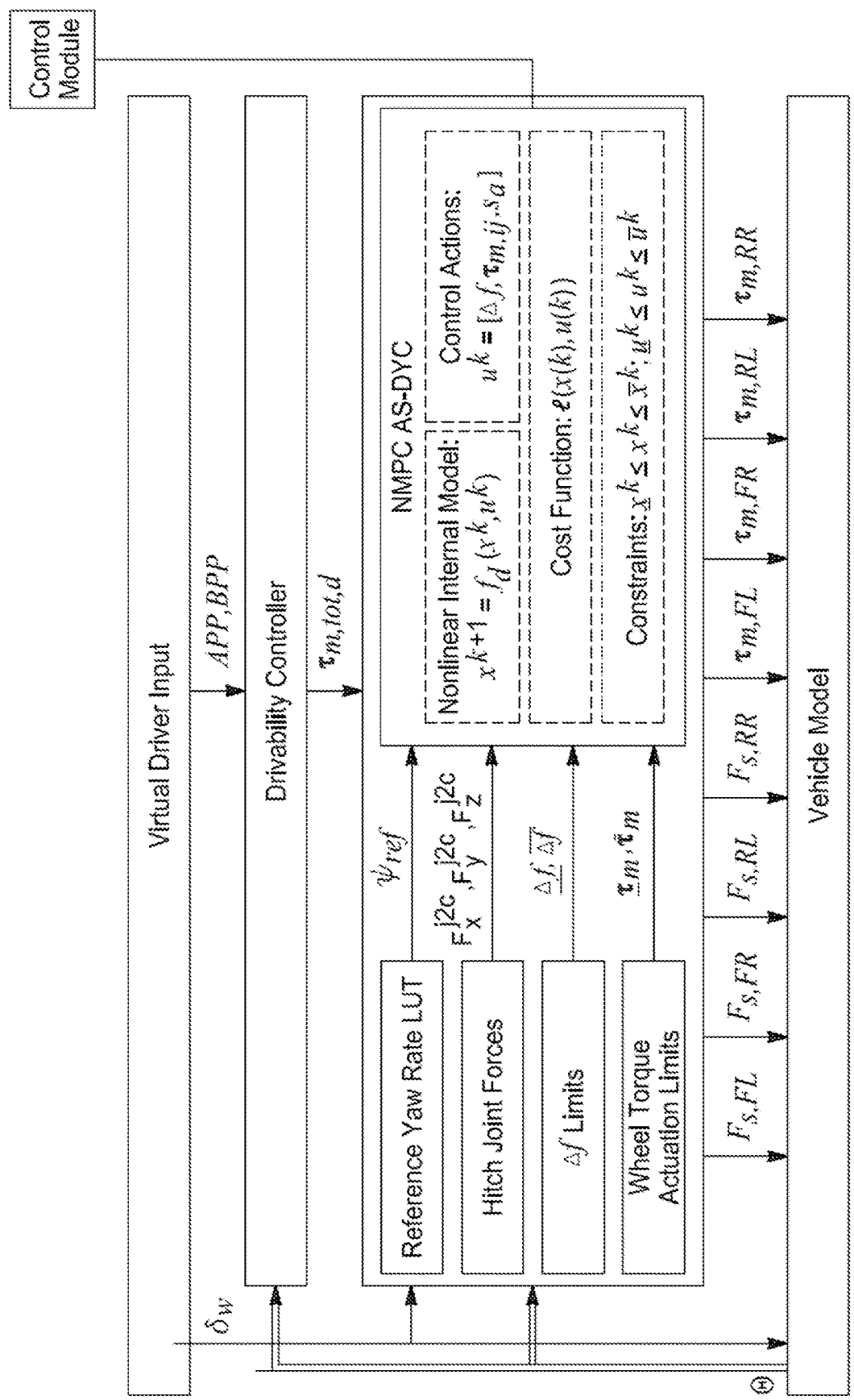
Figure 8:
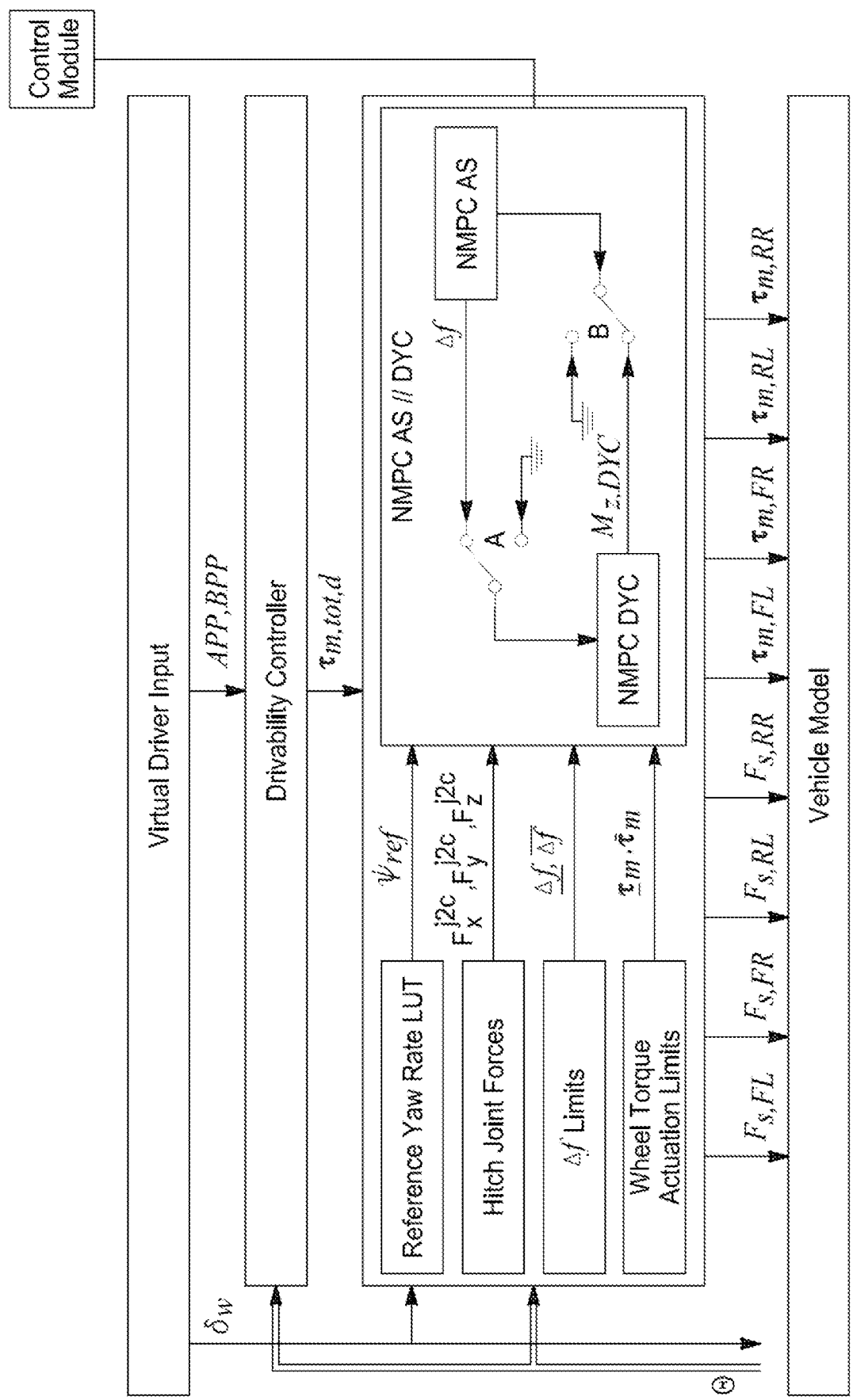
Figure 9:
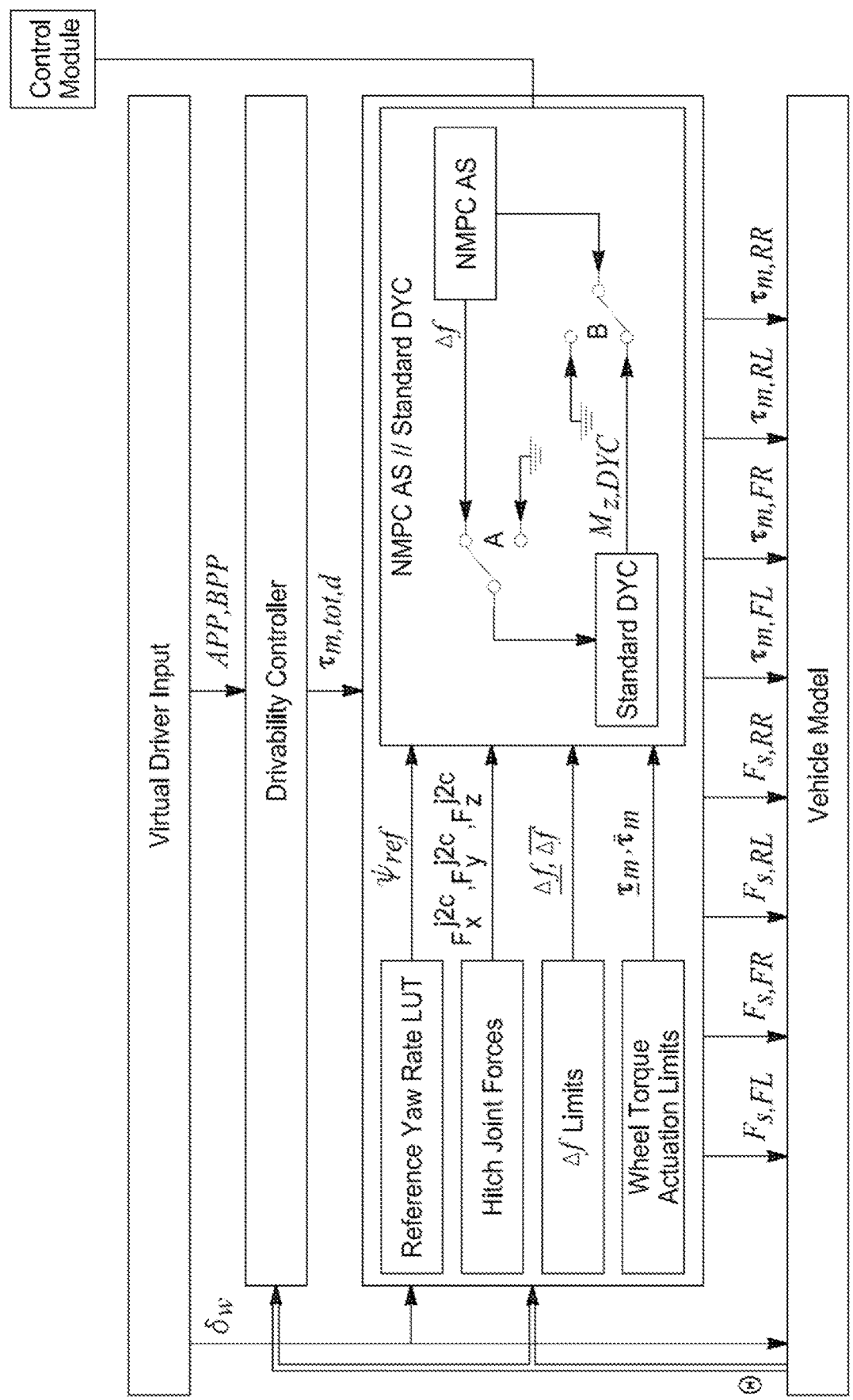

FIGS. 6-9 include functional block diagrams of example implementations of the system of FIG. 4. FIG. 6 includes an example active suspension (AS) configuration. FIGS. 7-9 include example AS plus dynamic yaw control (DYC) configurations. The control inputs for the AS configuration (FIG. 6) are a front-to-total anti-roll moment distribution variation, Δf, of the active suspension system, with respect to a predetermined nominal value. In the example of FIG. 7, in addition to the inputs of FIG. 6, the four torques on each wheel are used as control inputs. The control inputs in this example are Δf, $\tau_{m,FL}$, $\tau_{m,FR}$, $\tau_{m,RL}$, and $\tau_{m,RR}$. In the example of FIG. 8, the standalone AS and DYC for the articulated vehicle run in parallel sharing or not sharing the output control actions with each other. The control inputs for this example are Δf, $\tau_{m,FL}$, $\tau_{m,FR}$, $\tau_{m,RL}$, and $\tau_{m,RR}$. In the example of FIG. 9, the standalone AS for articulated vehicle and the standalone DYC for the isolated vehicle run in parallel sharing or not sharing the output control actions with each other. The control inputs for this example are Δf, $\tau_{m,FL}$, $\tau_{m,FR}$, $\tau_{m,RL}$, and $\tau_{m,RR}$.

In the formulations herein, the subscript i, with i=F,R indicates the axle, whereas the subscript j, with j=L, R, indicates the vehicle side. The notation '(˙)' indicates a time derivative, while '(¨)' indicates a second order time derivative. The subscript 't' indicates forces applied to the vehicle according to the directions of the trailer reference frame. Other variables are the sideslip angle at the CoG, β; the vehicle speed, V; and the hitch angle θ, namely the angle between the longitudinal axes of the trailer and the towing vehicle.

The proposed controller internal model, namely the model used by NMPC model of the control module for predicting the system response along the prediction horizon may be based on the following assumptions: motion is planar, and thus the road bank and inclination angles are negligible; heave, roll and pitch dynamics are disregarded; powertrain and braking torque on each corner is known in a first approximation; lateral and longitudinal displacements of the center of gravity caused by the roll and pitch motions are neglected;

The vehicle model used to determine the target forces for the suspension actuators may have 7 degrees of freedom, such as described by equations (1)-(4). FIGS. 1 and 2 illustrate states and parameters in accordance with their positive sign conventions.

Longitudinal force balance may be described by the equation:

$$m[\dot{v}_x - \dot{\psi}v_y] = \sum_{j=L,R}[F_{x,Fj}\cos(\delta) - F_{y,Fj}\sin(\delta)] + \sum_{j=L,R}F_{x,Rj} - F_{drag} + F_x^{j2c} \quad (1)$$

Lateral force balance may be described by the equation:

$$m[\dot{v}_y + \dot{\psi}v_x] = \sum_{j=L,R}[F_{x,Fj}\sin(\delta) + F_{y,Fj}\cos(\delta)] + \sum_{j=L,R}F_{y,Rj} + F_y^{j2c} \quad (2)$$

Yaw moment balance may be described by the equation:

$$J_z\ddot{\psi} = l_F[F_{x,FL}\sin(\delta) + F_{y,FL}\cos(\delta) + F_{x,FR}\sin(\delta) + F_{y,FR}\cos(\delta)] - \quad (3)$$

$$l_R[F_{y,RL} + F_{y,RR}] - \frac{t_R}{2}[F_{x,RL} + F_{x,RR}] - \frac{t_F}{2}[F_{x,FL}\cos(\delta) - F_{x,FR}\cos(\delta)] +$$

$$\frac{t_F}{2}[F_{y,FL}\sin(\delta) - F_{y,FR}\sin(\delta)] + cF_y^{j2c} + \sum_{\substack{j=L,R \\ i=F,R}} M_{z,ij}$$

Moment balance for a wheel ij may be described by the equation $$J_{w,i}^{eq} = \tau_{m,ij} - \tau_{b,ij} - R_{l,ij}F_{x,ij} - M_{y,ij} \quad (4)$$

In equations (1)-(4), m is the towing vehicle mass, $v_x$ is the component of the velocity vector at the center of gravity along the longitudinal axis of the vehicle reference system, $v_y$ is the component of the velocity vector at the center of gravity along the lateral axis of the vehicle reference system; $\dot{\psi}$ is the vehicle yaw rate, $F_{x,ij}$ is the longitudinal force of the ij-th tire/wheel, $F_{y,ij}$ is the lateral force of the ij-th wheel, $F_x^{j2c}$, $F_y^{j2c}$, $F_z^{j2c}$ are the hitch joint force components along the longitudinal, lateral and vertical axes of the reference system of the vehicle, respectively, $\delta$ is an (e.g., average) steering angle of the front wheels. $F_{drag}$ is an aerodynamic drag force, $J_z$ is the yaw mass moment of inertia of the car, $M_{z,ij}$ is a self-alignment moment of the ij-th wheel, $l_F$ and $l_R$ are the front and rear wheelbases of the vehicle, $t_F$ and $t_R$ are the front and rear track widths, c is the distance of the hitch joint to the CoG of the car. $J_{w,i}^{eq}$ is the equivalent mass moment of inertia of the front wheels, which may be approximated as equal to the polar inertia, $\tau_{m,ij}$ are the wheel motor/powertrain torques, and $\tau_{b,ij}$ are the wheel braking torques. In this example, the Magic Formula (e.g., version 2002 or another nonlinear tire model) may be used to determine the rolling radius, laden radius, rolling resistance, longitudinal force, lateral force, and self-aligning moment of the tires, namely $R_{e,ij}$, $R_{l,ij}$, $M_{y,ij}$, $F_{x,ij}$, $F_{y,ij}$ and $M_{z,ij}$, as functions of the tire slip angle $\alpha_{ij}$, longitudinal slip ratio $\sigma_{x,i,j}$, vertical load $F_{z,ij}$ which is expressed as a function of $F_x^{j2c}$, $F_y^{j2c}$, $F_y^{j2c}$, $F_z^{j2c}$, the longitudinal load transfer and the lateral load transfer, including the anti-roll moment contribution due to the active suspension actuation. Alternative formulations can be used in the example of a semi-active suspension system. The vertical loads may be expressed as:

$$F_{z,Fj} = \frac{1}{2}F_{z,F}^{stat} + \frac{1}{2}\Delta F_{z,F}^x + k_1\Delta F_{z,F}^y \quad (5)$$

$$F_{z,Rj} = \frac{1}{2}F_{z,R}^{stat} + \frac{1}{2}\Delta F_{z,R}^x + k_1\Delta F_{z,R}^y \quad k_1 = \begin{cases} -1 & \text{if } j = L \\ 1 & \text{if } j = R \end{cases}$$

$$F_{z,F}^{stat} = \frac{mgl_R}{l} + F_z^{j2c,stat}\frac{c - l_R}{l}$$

$$F_{z,R}^{stat} = \frac{mgl_F}{l} - F_z^{j2c,stat}\frac{c + l_F}{l}$$

$$\Delta F_{z,F}^x = -ma_x\frac{H_{CoG}}{l} + F_x^{j2c}\frac{H_{Hitch}}{l} + \Delta F_{z,t}^x\frac{c - l_R}{l}$$

$$\Delta F_{z,R}^x = ma_x\frac{H_{CoG}}{l} - F_x^{j2c}\frac{H_{Hitch}}{l} - \Delta F_{z,t}^x\frac{c + l_F}{l}$$

$$\Delta F_{z,R}^x = ma_x\frac{H_{CoG}}{l} - F_x^{j2c}\frac{H_{Hitch}}{l} - \Delta F_{z,t}^x\frac{c + l_F}{l}$$

$$\Delta F_{z,f}^y = \left[ma_y\frac{l_R}{l} + F_y^{j2c}\frac{c - l_R}{l}\right]\frac{H_{RC}}{d_F} + \frac{M_{AR,F}^{tot}}{d_F}$$

$$\Delta F_{z,R}^y = \left[ma_y\frac{l_F}{l} - F_y^{j2c}\frac{c + l_F}{l}\right]\frac{H_{RC}}{d_R} + \frac{M_{AR,R}^{tot}}{d_R}$$

where $H_{CoG}$ is the height of the CoG, $H_{RC}$ is the roll axis height at the longitudinal coordinate of the CoG, $F_z^{j2c,stat}$ is a static contribution of the vertical component of the hitch joint force, and $\Delta F_{z,t}^x$ is the longitudinal load transfer contribution of the vertical component of the hitch joint force due to the trailer longitudinal acceleration. In this example, the total active suspension anti-roll moment on the front and rear axles, $M_{AR,F}^{tot}$ and $M_{AR,R}^{tot}$, may be determined using the equations:

$$M_{AR,F}^{tot} = M_{AR,F}^{passive} + M_{AR,F}^{AS}$$

$$M_{AR,R}^{tot} = M_{AR,R}^{passive} + M_{AR,R}^{AS} \quad (6)$$

where the passive vehicle anti-roll moment on the i-th axle, $M_{AR,i}^{passive}$, and the active suspension anti-roll moments MA F include the hitch joint force components contributions, and may be determined using the equations:

$$M_{AR,F}^{passive} = \frac{K_{\varphi,F}}{K_{\varphi,F} + K_{\varphi,R}}\{[1 - K_{comp}]ma_y[H_{CoG} - H_{RC}] - F_y^{j2c}[H_{Hitch} - H_{RC}]\}$$

$$M_{AR,F}^{passive} = \frac{K_{\varphi,R}}{K_{\varphi,F} + K_{\varphi,R}}\{[1 - K_{comp}]ma_y[H_{CoG} - H_{RC}] - F_y^{j2c}[H_{Hitch} - H_{RC}]\}$$

$$M_{AR,F}^{AS} = K_{comp}f\ ma_y[H_{CoG} - H_{RC}]$$

$$M_{AR,R}^{AS} = K_{comp}[1 - f]ma_y[H_{CoG} - H_{RC}]$$

where $K_{\varphi,i}$ is the roll stiffness of the considered axle, $K_{comp}$ is a factor expressing the level of roll angle compensation of the active suspension actuation, and $f = f_{AR,0} + \Delta f$ is the controllable front-to-total anti-roll moment distribution. The total active suspension anti-roll moment may have different formulations, depending on the control implementation.

Suspension stiffness and damping characteristic may be known predetermined values. The total passive anti-roll moment may depend on the roll dynamics of the rigid vehicle and may be determined by the control module using the equations:

$$M_{AR,\dot{\varphi},i}^{passive} = K_{\dot{\varphi},i}\dot{\varphi}$$

$$M_{AR,\varphi,i}^{passive} = K_{\varphi,i}\varphi \tag{8}$$

where $\varphi$ is the roll angle, $\dot{\varphi}$ is the roll rate, $K_{\dot{\varphi},i}$ is a roll damping coefficient, $M_{AR,\dot{\varphi},i}^{passive}$ is the anti-roll moment due to the passive suspension roll stiffness, and $M_{AR,\dot{\varphi},i}^{passive}$ is the anti-roll moment due to passive suspension roll damping properties.

This example may involve extension of the internal model to the equations of motion by an additional degree of freedom, namely a roll dynamics contribution:

$$l_x\ddot{\varphi} = ma_y[H_{CoG} - H_{RC}]\cos(\varphi) + mg[H_{CoG} - H_{RC}]\sin(\varphi) - \tag{9}$$

$$M_{AR,\varphi,F}^{passive} - M_{AR,\varphi,R}^{passive} - M_{AR,\dot{\varphi},F}^{passive} - M_{AR,\dot{\varphi},R}^{passive} - M_{AR,F}^{AS} - M_{AR,R}^{AS} +$$

$$\frac{m_t g l_{tF}}{l_t}[H_{Hitch} - H_{RC}]\sin(\varphi) + F_y^{j2c}[H_{Hitch} - H_{RC}]\cos(\varphi)$$

where $m_t$ is the mass of the trailer, $l_{tF}$ is the hitch joint to trailer CoG distance, $\alpha_{y,t}$ and $\alpha_{x,t}$ are the acceleration components of the trailer, and $F_y^{j2c}$ depends on the trailer acceleration components, trailer parameters, and trailer hitch angle. The roll dynamics may be disregarded, so sensing devices on the trailer may not be included, such as to measure $\theta$, $\alpha_{y,t}$ and $\alpha_{x,t}$.

The longitudinal and lateral slips $\sigma_{x,i,j}$, and $\alpha_{ij}$ may be determined by the control module using the equations:

$$\alpha_{ij} = \tan^{-1}\left(\frac{v_y \pm \dot{\psi}l_i}{v_x \mp \frac{d_i}{2}\dot{\psi}}\right) - k_2\delta \quad \begin{cases} k_2 = 1 & \text{if } i = F \\ k_2 = 0 & \text{if } i = R \end{cases} \tag{10}$$

$$\sigma_{x,ij} = \frac{\omega_{ij}R_{e,ij} - v_{x,ij}}{v_{x,ij}} \tag{11}$$

where $v_{x,ij}$ is the longitudinal component of the peripheral wheel speed.

The prediction model could have different formulations. For example, the prediction model may not involve wheel dynamics.

In various implementations, the hitch force module 420 may determine hitch joint force components (or hitch forces) based on the following assumptions: the yaw and pitch acceleration of the trailer 104 are disregarded; and the longitudinal and lateral accelerations of the trailer $\alpha_{x,t}$ and $\alpha_{y,t}$ are approximated by the hitch force module 420 based on the acceleration components of the vehicle 100.

FIGS. 1 and 2 show the orientation of the hitch joint force components together with the sign conventions for the trailer variables. The longitudinal component $F_{x,t}^{j2c}$ is determined by the hitch force module 420 based on the longitudinal forces balance, such as using the equation:

$$F_{x,t}^{j2c} = -m_t\alpha_{x,t} \cong -m_t\alpha_x \tag{12}$$

where $m_t$ is the mass of the trailer 104. Considering the example of FIG. 1, the rotation balance with respect to the CoG of the trailer axle may be used by the hitch force module 420 to determine the latitudinal force, such as using the equation:

$$F_{y,t}^{j2c} = -\frac{m_t a_{y,t} l_{tR}}{l_t} \cong -\frac{m_t a_y l_{tR}}{l_t} \tag{13}$$

where $l_{R,t}$ is the trailer CoG to the trailer axle distance, and/t is the hitch joint to trailer axle distance. $F_{x,t}^{j2c}$ and $F_{y,t}^{j2c}$ may be transposed by the hitch force module 420 into the towing vehicle coordinate system and defined as:

$$F_x^{j2c} = -m_t a_x \cos(\theta_{kin}) - \frac{m_t a_y l_{tR}}{l_t}\sin(\theta_{kin}) \tag{14}$$

$$F_y^{j2c} = m_t a_x \sin(\theta_{kin}) - \frac{m_t a_y l_{tR}}{l_t}\cos(\theta_{kin}) \tag{15}$$

where $\theta_{kin}$ is the kinematic hitch angle, the hitch angle in absence of slip angles. An example equation describing the evolution of the kinematic hitch angle for a given vehicle speed is:

$$\theta_{kin} = \tag{16}$$

$$\tan^{-1}\left(\frac{\tan(\delta)\left[l^2 l_t + [c - l_R]\sqrt{\tan(\delta)^2 l^2[c - l_R]^2 - \tan(\delta)^2 l^2 l_t^2 + l^4}\right]}{l\left[-\tan(\delta)^2 l_t [c - l_R] + \sqrt{\tan(\delta)^2 l^2 [c - l_R]^2 - \tan(\delta)^2 l^2 l_t^2 + l^4}\right]}\right)$$

Alternative formulations for computing hitch angle may be based on its value in quasi-steady-state cornering conditions, such as mapped in look-up tables as functions of steering angle, vehicle speed, and tire-road friction coefficient. Alternatively, a state observer including the trailer dynamics may be used to determine the hitch angle.

Considering the example in FIG. 2, the rotation balance with respect to the CoG of the trailer axle can be used to determine the vertical hitch force by the hitch force module 420, such as using the equation:

$$F_{z,t}^{j2c} = F_{z,t}^{j2c,stat} + \Delta F_{z,t}^x = \tag{17}$$

$$-\frac{m_t g l_{R,t}}{l_t} + \frac{m_t a_{x,t}[H_{CoG,t} - H_{Hitch}]}{l_t} \cong -\frac{m_t g l_{R,t}}{l_t} + \frac{m_t a_x[H_{CoG,t} - H_{Hitch}]}{l_t}$$

$F_{z,t}^{j2c}$ assumes the same value when transposed to the towing car coordinate system.

The NMPC model may be expressed by the following continuous formulation $$\dot{x}(t) = f(x(t), u(t)) \tag{18}$$

where the state vector for the articulated vehicle model and the state vector for the rigid vehicle model x is:

$$x = [v_x, v_y, \dot{\psi}, \omega_{FL}, \omega_{FR}, \omega_{RL}, \omega_{RR}] \tag{19}$$

and the control vector u of the control module is:

$$u = [\Delta f, \tau_{m,FL}, \tau_{m,FR}, \tau_{m,RL}, \tau_{m,RR}] \tag{20}$$

In example of the roll dynamics being included in the NMPC model formulation, the following state vector may be considered:

$$x_\varphi = [v_x, v_y, \dot{\psi}, \omega_{FL}, \omega_{FR}, \omega_{RL}, \omega_{RR}] \tag{21}$$

The NMPC control law may minimizes a cost function J, subject to equality and inequality constraints. The nonlinear optimal control problem may be defined in discrete time as:

$$\min_u J(x(0), u(\cdot)) := \ell_N(x(N)) + \sum_{k=0}^{N-1} \ell(x(k), u(k)) \tag{22}$$

-continued s.t.

$x(0) = x_{in}$ $x(k+1) = f_d(x(k), u(k))$ (5)

$\underline{x} \leq x(k) \leq \bar{x}$ $\underline{x} \leq x(N) \leq \bar{x}$ $\underline{u} \leq u(k) \leq \bar{u}$ $u(\cdot):[0, N-1]$ where $\ell_N(x(N))$ is a terminal cost, N is the number of steps of the prediction horizon $H_p$ (e.g., equal to the control horizon $H_c$, i.e. $H_p = H_c = NT_s$ with $T_s$ being the sampling time, but could be a different value), k indicates the discretization step, $\underline{x}$ and $\bar{x}$ are the lower and upper limits for x, $\underline{u}$ and $\bar{u}$ are the lower and upper limits for u, $x(k+1)=f_d(x(k),u(k))$ is a discretized model defined in equation (18). The stage cost functions may be defined as a least-squares functions and are given by equation (23) for configurations with the articulated and the isolated vehicle model, respectively.

$$\ell(x(k), u(k)) = W_{Q,\Delta\dot{\psi}}\Delta\dot{\psi}^2 + W_{Q,\Delta\varphi}\Delta\varphi^2 + \qquad (24)$$
$$W_{Q,\Delta\tau_{m,tot}}\Delta\tau_{m,tot}^2 + W_{R,\tau_{m,ij}}\sum \tau_{m,ij}^2 + W_{R,\Delta f}\Delta f^2 + W_{R,s_{\alpha_R}} s_{\alpha_R}^2$$

where $W_{Q,\dot{\psi}}$, $W_{Q,\Delta\varphi}$, $W_{Q,\Delta\tau_{m,tot}}$ and $W_{Q,\theta}$ are the cost function weights, respectively, tracking of the rigid vehicle reference yaw rate of the rigid vehicle roll angle, of the torque demand (target) or of the articulation hitch angle, $W_{R,s_{\alpha_R}}$ is a weighting coefficient referred to as a rear tire slip angle slack variable, $W_{R,\tau_{m,ij}}$ and $W_{R,\Delta f}$ are the cost function weights referred to as available actuators. The contributions in equation (23) are based on:

$\Delta\dot{\psi}=\dot{\psi}_{ref}-\dot{\psi}$, the yaw rate tracking error;

$\Delta\varphi=\varphi_{ref}-\varphi$, $\Delta\varphi=RI_{ref}-RI$, roll angle tracking error and rollover index (RI) minimization, respectively.

Alternatively, rollover prevention may be accounted for by adding a soft constraint on the rollover index through a slack variable, $RI \leq RI^{max}(1+\sigma_{RI})$, where $s_{RI} \geq 0$ is the slack variable. In the following application, the contribution of tracking the roll angle error may be disregarded.

$\Delta\tau_{m,tot}$ is a torque demand tracking error at the vehicle level between the driver demands and a reference total torque. Slack variables may be used to set the soft constraints.

The following state and control action bounds have been implemented in equation 22 as constraints (lower and upper limits):

Wheel torque constraints, i.e. $\underline{\tau}_m \leq \tau_{m,ij} \leq \bar{\tau}_m$, where $\underline{\tau}_m$ and $\bar{\tau}_m$ are the predetermined minimum and maximum values of the wheel torques, used to generate the direct yaw moment control action, in addition to the total traction or braking torques;

The front-to-total anti-roll moment distribution deviation constraint, $\underline{\Delta f} \leq \Delta f \leq \overline{\Delta f}$, where $\underline{\Delta f}$ and $\overline{\Delta f}$ are predetermined minimum and maximum anti-roll front-to- total moment distribution deviations from a nominal value;

Rear tire slip angle constraint to account for vehicle lateral stability, $|\alpha_R| \leq \alpha_R^{max}(1+s_{\alpha_R})$, where $s_{\alpha_R} \geq 0$ is the slack variable; and $\alpha_R^{max}$ is the maximum admissible tire slip angle, for example, $\alpha_R^{max}=3$ degrees or another suitable value.

Further constraints are possible, such as to prevent the activation of a stability controller. Constraints on the front slip angle of the vehicle, on the vehicle sideslip angle, and on the tire slip ratios of the vehicle may additionally or alternatively be implemented.

FIG. 6 shows the schematics of a standalone AS implementation. Here, the driver inputs are APP, BPP and $\delta_w$. $\Theta$ represents the vehicle operational parameters measured by sensors and received via a network bus of the vehicle. The driver inputs are converted into the reference yaw rate and torque demand, which together with the reference hitch forces and the actuator physical constraints, are conveyed to the control module as constant inputs in the prediction horizon. In various implementations, NMPC (nonlinear model predictive control) may be used by the control module. The NMPC includes a nonlinear optimal control problem, where the inputs undergo a nonlinear internal model to define the optimal control actions along the prediction horizon. The control actions are defined by minimizing the constrained objective function. The final outputs are the forces of the actuators 304-316 on each corner of the vehicle.

FIG. 7 is an example of an NMPC AS-DYC implementation, where DYC is a torque-vectoring actuation strategy involving control of the electric motors 324-336. Here, physical constraints of the motors are an additional input with respect to the standalone AS implementation of FIG. 6. Moreover, the final outputs of the nonlinear optimal control problem of the example of FIG. 7 are the vertical forces for the actuators 304-316 and the wheel torques for the electric motors 324-336.

Parallel or independent control of the actuators 304-316 and the wheel torques for the electric motors 324-336 may be performed. For example, an NMPC AS//DYC implementation with and without communication between the actuator and wheel control modules is illustrated in FIG. 8. In this example, a standalone AS NMPC implementation (e.g., FIG. 6) with an articulated vehicle internal model runs in parallel to a NMPC DYC implementation with an internal model formulation resembling NMPC AS, namely with the hitch angle dynamics to account for the trailer, represented by equations 19-21 and 23. The two subsystems (actuator and motor controls) run independently either sharing the information of their respective control actions which are taken into account as additional inputs by the other (with communication) or without sharing the information of their respective control actions with each other.

FIG. 9 includes an example NMPC AS//Standard DYC implementation with and without communication between the actuator and motor controls, where a standalone AS NMPC implementation (e.g., FIG. 6) with an articulated vehicle internal model in parallel to a standard NMPC DYC implementation with a rigid vehicle internal model, calibrated for an isolated vehicle. Here, the same communication options may be enabled or disabled. In FIGS. 8 and 9, where the switches A and B enable or disable the communication between the two controls running in parallel.

The NMPC can be implemented on a software environment for automatic control and dynamic optimization. The following may be used: Gauss Newton Hessian approximation, multiple shooting discretization, a qpOASES solver, a number of optimization steps may be set equal to 2, a discretization time of the internal models may be set to 5 ms (this may ensures their numerical stability without significantly affecting the computational time), for the integrator types and orders $2^{nd}$ order Implicit Runge Kutta (IRK-GL2) for the controls based on the articulated vehicle and 4th order Implicit Runge Kutta (IRK-GL4) for DYC based on the rigid vehicle model, sampling time for each articulated vehicle model may be 35 ms (milliseconds), while the sampling time for DYC implementation may be 15 ms. Example implementation settings are summarized in the following table with measured variables coming from the vehicle.

TABLE I

Example of Implemented Control Module Settings

| Actuation | Integrator | $t_d$ (ms) | $t_{ta}$ (ms) |
| --- | --- | --- | --- |
| AS | IRK-GL4 | 5 | 15 |
| AS-DYC | IRK-GL4 | 5 | 15 |
| AS//DYC | IRK-GL4 | 5 | 15 |
| AS//Standard DYC | IRK-GL4 | 5 | 15 |

Testing proved that these parametrizations are a good compromise between performance and computational efficiency. The present application involves use of active suspension system on the towing vehicle to limit the trailer sway with, for example, a nonlinear model predictive control (NMPC) on an articulated vehicle model that includes the trailer parameters and dynamics. Additionally, the present application involves use of the active suspension and direct yaw control on the towing vehicle to preserve the articulated vehicle stability and to limit the trailer sway with nonlinear model predictive control coordination based on an articulated vehicle model which includes the trailer parameters and dynamics. Additionally, the present application involves use of active suspension and direct yaw moment control coordination with two parallel NMPC configuration based on an articulated vehicle model (or isolated vehicle model for the case of the Standard DYC) as an alternative in preserving the articulated vehicle stability and to limit the trailer sway.

The control described herein stabilizes the vehicle-trailer system as opposed to the passive vehicle. The active suspension control NMPC AS effectively tracks the towing vehicle reference yaw rate and tracks and limits the hitch force errors (differences between the hitch forces and reference hitch forces, respectively) and the trailer roll angle. AS plus DYC implementation can further improve the yaw and hitch damping capability relative to only AS control. Moreover, the trailer roll angle is further limited.

Figure 10:
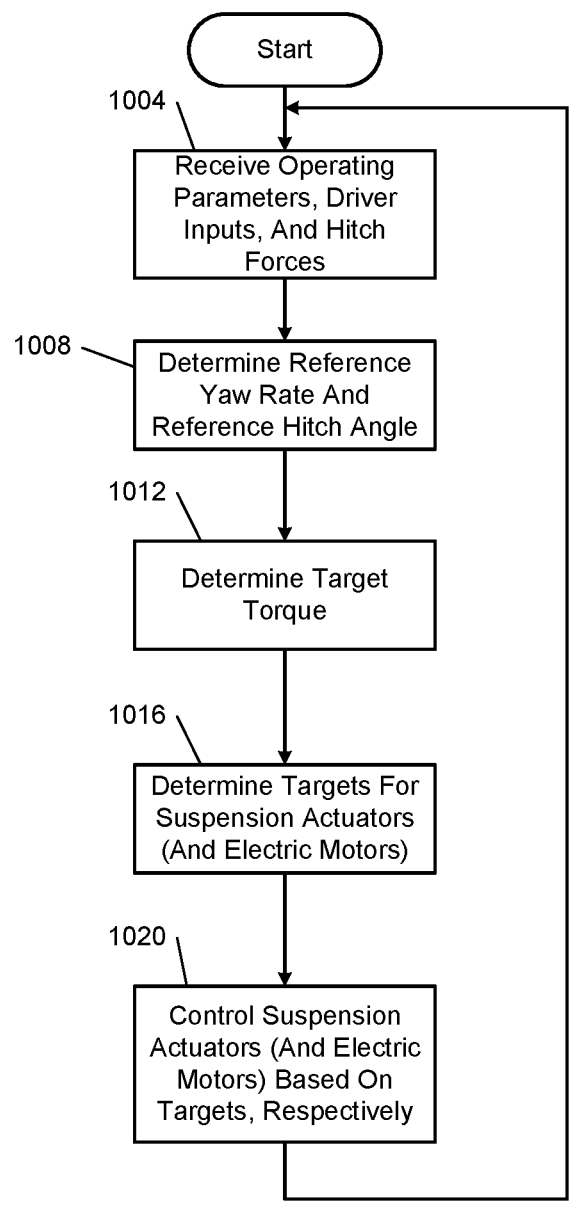
FIG. 10 is a flowchart depicting an example method of controlling one or more vehicle actuators based on hitch forces of the trailer.

FIG. 10 is a flowchart depicting an example method of controlling one or more vehicle actuators based on hitch forces. Control begins with 1004 where the driver inputs, the hitch forces, and other vehicle operating parameters are received.

At 1008, the reference yaw rate module 408 determines the reference yaw rate based on the steering angle, the vehicle speed, and the tire-road coefficient of friction. The reference hitch forces module 412 also determines the reference hitch forces at 1012. At 1012, the target torque module 404 determines the target torque based on the driver inputs and the hitch forces.

At 1016, the actuator control module 320 determines target forces for the suspension actuators 304-316, respectively, based on the hitch forces, the reference hitch forces, the target torque, the reference yaw rate, and the yaw rate, such as using NMPC control. The actuator control module 320 may set the target forces, for example, to minimize the difference (error) between the hitch forces and the reference hitch forces and to minimize the difference (error) between the yaw rate and the reference yaw rate.

Also at 1016, the wheel control module 340 may determines target torques for the motors 324-336, respectively, based on the hitch forces, the reference hitch forces, the target torque, the reference yaw rate, and the yaw rate, such as using NMPC control. The wheel control module 340 may set the target torques, for example, to minimize the difference (error) between the hitch forces and the reference hitch forces and to minimize the difference (error) between the yaw rate and the reference yaw rate. In various implementations, the wheel control module 340 may determine the target torques based on the target forces and/or determine the target forces based on the target torques.

At 1020, the actuator control module 320 controls the suspension actuators 304-316 to achieve the target (vertical) forces, respectively. The actuator control module 320 may, for example, apply power or hydraulic fluid to the suspension actuators 304-326 based on the target forces, respectively. The wheel control module 340 may also apply power to the electric motors 328-336 to achieve the target torques, respectively. Control returns to 1004 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A trailer sway control system for a vehicle, comprising:
a front left active suspension actuator associated with a front left wheel of the vehicle;
a front right active suspension actuator associated with a front right wheel of the vehicle;
a rear left active suspension actuator associated with a rear left wheel of the vehicle;
a rear right active suspension actuator associated with a rear right wheel of the vehicle; and
an actuator control module configured to:
based on (a) a first hitch force at a trailer hitch of the vehicle in a longitudinal direction, (b) a second hitch force at the trailer hitch of the vehicle in a lateral direction, and (c) a third hitch force at the trailer hitch of the vehicle in a vertical direction, determine target vertical forces for the front left active suspension actuator, the front right active suspension actuator, the rear left active suspension actuator, and the rear right active suspension actuator, respectively; and
adjust the front left active suspension actuator, the front right active suspension actuator, the rear left active suspension actuator, and the rear right active suspension actuator based on the target vertical forces, respectively.

2. The trailer sway control system of claim 1 wherein the actuator control module is configured to determine the target vertical forces based on minimizing (a) a first difference between the first hitch force and a first reference hitch force, (b) a second difference between the second hitch force and a second reference hitch force, and (c) a third difference between the third hitch force and a third reference hitch force.

3. The trailer sway control system of claim 2 further comprising a reference hitch forces module configured to set the first reference hitch force, the second reference hitch force, and the third reference hitch force based on a steering angle of the vehicle.

4. The trailer sway control system of claim 1 wherein the actuator control module is configured to determine the target vertical forces further based on a yaw rate of the vehicle.

5. The trailer sway control system of claim 4 wherein the actuator control module is configured to determine the target vertical forces based on minimizing a difference between the yaw rate and a reference yaw rate.

6. The trailer sway control system of claim 5 further comprising a reference yaw rate module configured to set the reference yaw rate based on a steering angle of the vehicle.

7. The trailer sway control system of claim 6 wherein the reference yaw rate module is configured to set the reference yaw rate further based on a vehicle speed.

8. The trailer sway control system of claim 1 further comprising:
   a front left electric motor configured to output torque to the front left wheel of the vehicle;
   a front right electric motor configured to output torque to the front right wheel of the vehicle;
   a rear left electric motor configured to output torque to the rear left wheel of the vehicle;
   a rear right electric motor configured to output torque to the rear right wheel of the vehicle; and
   a wheel control module configured to:
      based on the first hitch force, the second hitch force, and the third hitch force, determine target torque outputs of the front left electric motor, the front right electric motor, the rear left electric motor, and the rear right electric motor, respectively; and
      adjust the front left electric motor, the front right electric motor, the rear left electric motor, and the rear right electric motor based on the target torque outputs, respectively.

9. The trailer sway control system of claim 8 wherein the wheel control module is configured to determine the target torque outputs further based on the target vertical forces.

10. The trailer sway control system of claim 8 wherein the actuator control module is configured to determine the target vertical forces further based on the target torque outputs.

11. The trailer sway control system of claim 1 further comprising:
   a front electric motor configured to output torque to front wheels of the vehicle;
   a rear electric motor configured to output torque to rear wheels of the vehicle; and
   a wheel control module configured to:
      based on the first, second, and third hitch forces, determine target torque outputs of the front and rear electric motors, respectively; and
      adjust the front and rear electric motors based on the target torque outputs, respectively.

12. The trailer sway control system of claim 1 further comprising:
   an electric motor configured to output torque to two or more wheels of the vehicle; and
   a wheel control module configured to:
      based on the first, second, and third hitch forces, determine a target torque of the electric motor; and
      adjust the electric motor based on the target torque.

13. A trailer sway control method for a vehicle, comprising:
   based on (a) a first hitch force at a trailer hitch of the vehicle in a longitudinal direction, (b) a second hitch force at the trailer hitch of the vehicle in a lateral direction, and (c) a third hitch force at the trailer hitch of the vehicle in a vertical direction, determining target vertical forces for a front left active suspension actuator, a front right active suspension actuator, a rear left active suspension actuator, and a rear right active suspension actuator, respectively,
   the front right active suspension actuator associated with a front right wheel of the vehicle, the front left active suspension actuator associated with a front left wheel of the vehicle, the rear left active suspension actuator associated with a rear left wheel of the vehicle, and the rear right active suspension actuator associated with a rear right wheel of the vehicle; and
   adjusting the front left active suspension actuator, the front right active suspension actuator, the rear left active suspension actuator, and the rear right active suspension actuator based on the target vertical forces, respectively.

14. The trailer sway control method of claim 13 wherein determining the target vertical forces includes determining the target vertical forces based on minimizing (a) a first difference between the first hitch force and a first reference hitch force, (b) a second difference between the second hitch force and a second reference hitch force, and (c) a third difference between the third hitch force and a third reference hitch force.

15. The trailer sway control method of claim 14 further comprising setting the first reference hitch force, the second reference hitch force, and the third reference hitch force based on a steering angle of the vehicle.

16. The trailer sway control method of claim 13 wherein determining the target vertical forces includes determining the target vertical forces further based on a yaw rate of the vehicle.

17. The trailer sway control method of claim 16 wherein determining the target vertical forces includes determining the target vertical forces based on minimizing a difference between the yaw rate and a reference yaw rate.

18. The trailer sway control method of claim 17 further comprising setting the reference yaw rate based on a steering angle of the vehicle.

19. The trailer sway control method of claim 18 wherein setting the reference yaw rate includes setting the reference yaw rate further based on a vehicle speed.

20. The trailer sway control method of claim 13 further comprising:
   based on the first, second, and third hitch forces, determining a target torque of an electric motor configured to output torque to two or more wheels of the vehicle; and
   adjusting the electric motor based on the target torque.

* * * * *